United States Patent
Della Corte et al.

(10) Patent No.: US 9,679,161 B2
(45) Date of Patent: Jun. 13, 2017

(54) DISTRIBUTION OF ENCRYPTED INFORMATION IN MULTIPLE LOCATIONS

(71) Applicant: GLOBALFOUNDRIES Inc., Grand Cayman (KY)

(72) Inventors: Gianluca Della Corte, Rome (IT); Alessandro Donatelli, Rome (IT); Antonio M. Sgro, Fiumicino (IT)

(73) Assignee: GLOBALFOUNDRIES INC., Grand Cayman (KY)

( * ) Notice: Subject to any disclaimer, the term of this patent is extended or adjusted under 35 U.S.C. 154(b) by 37 days.

(21) Appl. No.: 14/248,814

(22) Filed: Apr. 9, 2014

(65) Prior Publication Data
US 2014/0325212 A1    Oct. 30, 2014

(30) Foreign Application Priority Data

Apr. 25, 2013  (GB) .................................. 1307459.6

(51) Int. Cl.
*G06F 21/60* (2013.01)
*G06F 21/62* (2013.01)
(Continued)

(52) U.S. Cl.
CPC ........ *G06F 21/6272* (2013.01); *H04L 9/0618* (2013.01); *H04L 9/0637* (2013.01);
(Continued)

(58) Field of Classification Search
CPC .................. G06F 21/602; G06F 21/53; G06F 2221/2107; H04L 63/0428; H04L 63/062
See application file for complete search history.

(56) References Cited

U.S. PATENT DOCUMENTS

| 8,259,934 B2 | 9/2012 | Karroumi et al. |
| 8,341,427 B2 | 12/2012 | Auradkar et al. |

(Continued)

FOREIGN PATENT DOCUMENTS

| CN | 102655508 A1 | 9/2012 |
| WO | WO2012163043 A1 | 12/2012 |

OTHER PUBLICATIONS

Davies, "Patents Act 1977: Search Report under Section 17(5)", for GB Application No. 1307459.6, Intellectual Property Office, United Kingdom, mailed Oct. 28, 2013.

(Continued)

*Primary Examiner* — Yonas Bayou
(74) *Attorney, Agent, or Firm* — Heslin Rothenberg Farley & Mesiti P.C.; George Blasiak

(57) ABSTRACT

A method, system, and/or computer program product stores information in a distributed data-processing environment. The method comprises: encrypting, by one or more processors, a piece of information; splitting, by one or more processors, the encrypted piece of information into at least one first encrypted block and at least one second encrypted block, at least part of said at least one first encrypted block being required for decrypting said at least one second encrypted block; distributing, by one or more processors, said at least one first encrypted block for storing in at least one first location; and distributing, by one or more processors, said at least one second encrypted block for storing in at least one second location.

18 Claims, 4 Drawing Sheets

(51) Int. Cl.
*H04L 29/06* (2006.01)
*H04L 9/06* (2006.01)
*H04L 9/08* (2006.01)

(52) U.S. Cl.
CPC ........ *H04L 9/0894* (2013.01); *H04L 63/0428* (2013.01); *G06F 2221/2107* (2013.01)

(56) References Cited

U.S. PATENT DOCUMENTS

| | | | |
|---|---|---|---|
| 8,347,398 | B1 | 1/2013 | Weber |
| 9,213,867 | B2* | 12/2015 | Ramamurthy ...... G06F 21/6218 |
| 9,229,771 | B2* | 1/2016 | Armour ................ G06F 9/4843 |
| 9,262,643 | B2* | 2/2016 | Cidon ................ G06F 21/6218 |
| 9,292,457 | B2* | 3/2016 | Menon .................... G06F 13/28 |
| 9,444,896 | B2* | 9/2016 | Zheng .................... H04L 67/16 |
| 9,454,441 | B2* | 9/2016 | Elson ................ G06F 11/1662 |
| 9,516,003 | B2* | 12/2016 | Menon ................ H04L 63/102 |
| 2008/0155540 | A1 | 6/2008 | Mock et al. |
| 2008/0181405 | A1 | 7/2008 | Seppanen |
| 2010/0111298 | A1* | 5/2010 | Krig ...................... H04L 9/0637 380/37 |
| 2010/0150341 | A1 | 6/2010 | Dodgson et al. |
| 2010/0150344 | A1* | 6/2010 | Karroumi ............ H04L 9/0637 380/45 |
| 2010/0299313 | A1 | 11/2010 | Orsini et al. |
| 2010/0299538 | A1* | 11/2010 | Miller ................ G06F 12/1408 713/190 |
| 2010/0306524 | A1 | 12/2010 | Runkis et al. |
| 2011/0194693 | A1* | 8/2011 | Izu ........................ G06F 21/602 380/255 |
| 2012/0042162 | A1* | 2/2012 | Anglin .................... G06F 21/57 713/165 |
| 2013/0067212 | A1* | 3/2013 | Farrugia ............... H04L 9/0631 713/150 |

OTHER PUBLICATIONS

Jain, et al. "Implementing DES Algorithm in Cloud for Data Security", VSRD International Journal of Computer Science & Information Technology, vol. 2(4), 2012, pp. 316-321.

Eftaxiopoulos-Sarris, et al. "Design and Implementation of a Versatile Hardware Crypto IP for Symmetric and Asymmetric Algorithms", Diploma Thesis, National Technical University of Athens, School of Electrical and Computer Engineering, Division of Computer Science, Oct. 2012, pp. 1-148.

Kaur, et al. "Using encryption Algorithms to enhance the Data Security in Cloud Computing", International Journal of Communication and Computer Technologies, vol. 01, No. 12, Issue Jan. 3, 2013, pp. 56-59.

Porwal, et al. "An Approach for Secure Data Transmission in Private Cloud", International Journal of Soft Computing and Engineering (IJSCE), vol. 2, Issue-1, Mar. 2012, pp. 151-155.

Mukundrao, et al. "Enhanding Security in Cloud Computing", Information and Knowledge Management, vol. 1, No. 1, 2011, pp. 40-45.

Tao, et al. "Protecting Data Confidentiality in Cloud Systems", ACM, Proceedings of the 4th Asia-Pacific Symposium on Internetware, 2012, Article No. 18, pp. 1-12.

* cited by examiner

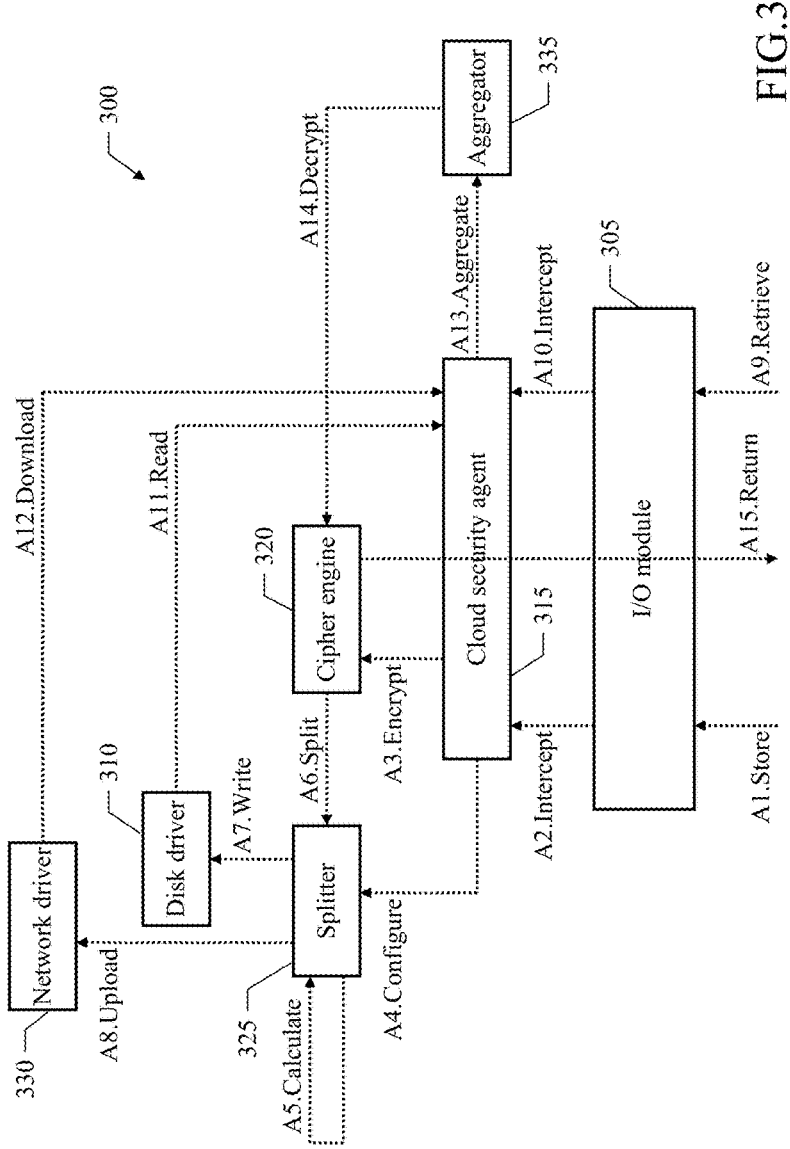

DISTRIBUTION OF ENCRYPTED INFORMATION IN MULTIPLE LOCATIONS

BACKGROUND

The solution according to one or more embodiments of the present invention relates to the data-processing field. More specifically, this solution relates to the storing of information in a distributed data-processing environment.

Information security (i.e., the practice of protecting information from undesired actions) is a key issue in modern data-processing systems. Particularly, one of the main aspects of information security is confidentiality of the information (i.e., its protection from unauthorized accesses).

The confidentiality of the information is particularly important in distributed data-processing systems, wherein the information may be shared among multiple computing machines connected over a network (especially when the network is public, such as the Internet). A typical example is in a cloud computing (or simply cloud) infrastructure, wherein users of the network are allowed to access computing resources on-demand as services (referred to as cloud resources and cloud services, respectively); the cloud services are made available by cloud providers, which provision, configure and release the cloud resources upon request (so that they are generally of the virtual type with their actual implementation that is completely opaque to the users).

In this way, the users are relived of the management of the actual physical resources that are needed to implement the cloud resources (for example, their installation and maintenance); particularly, this provides economies of scale, improved exploitation of the physical resources, and high peak-load capacity. Moreover, the users are now allowed to perform tasks (on a pay-per-use basis) that were not feasible previously because of their cost and complexity (especially for individuals or small companies). The de-coupling of the cloud resources from their implementation provides the illusion of an infinite capacity thereof; moreover, the de-localization of the physical resources implementing the cloud resources enables the users to access them from anywhere.

However, the cloud infrastructure poses a number of additional threats to the confidentiality of the information of its users that is stored in the cloud infrastructure. Particularly, the information is continually transmitted over the Internet, wherein it may be intercepted. Moreover, when the cloud providers are third parties, the users loose control of the measures that are implemented to protect it. In any case, the cloud resources assigned to the different users of the cloud infrastructure are not physically segregated; therefore, attacks against the information of any user of the cloud infrastructure may now be launched directly from inside the cloud infrastructure by other users thereof.

The techniques commonly used to enforce the confidentiality of the information (especially in cloud infrastructures) are based on its encryption. Generally speaking, the encryption is the process of transforming information (referred to as plaintext) into a non-intelligible form that conceals its meaning (referred to as chipertext) by means of an algorithm, so that the chipertext may be used by authorized entities only to restore the plaintext with an inverse process (referred to as decryption). The algorithms used to encrypt the plaintext and to decrypt the ciphertext (referred to as a whole as chiper) are generally based on the use of one or more keys (i.e., parameters of the chiper required to produce useful results).

However, none of the encryption techniques that may be used in practice is inherently secure. Therefore, it is not possible to exclude that an attack by a hostile entity whose purpose is of preventing the authorized entities to maintain the confidentiality of the information (referred to as adversary) may be able to gain access to it.

In view of the above, several techniques have been proposed for increasing the security (especially in cloud infrastructures). For example, one known prior art proposes splitting the information into multiple portions that are stored or communicated distinctly, with the original information, the portions of the information or both of them that may also be encrypted. This makes the access to the (encrypted) portions more difficult (especially when they are stored in locations that are geographically remote).

However, in this case as well the same threats pointed out above apply once an adversary has managed to collect all the encrypted portions.

SUMMARY

A method, system, and/or computer program product stores information in a distributed data-processing environment. The method comprises: encrypting, by one or more processors, a piece of information; splitting, by one or more processors, the encrypted piece of information into at least one first encrypted block and at least one second encrypted block, at least part of said at least one first encrypted block being required for decrypting said at least one second encrypted block; distributing, by one or more processors, said at least one first encrypted block for storing in at least one first location; and distributing, by one or more processors, said at least one second encrypted block for storing in at least one second location.

BRIEF DESCRIPTION OF THE SEVERAL VIEWS OF THE DRAWINGS

FIG. 3 shows a collaboration diagram representing the roles of the main software components that may be used to implement the solution according to an embodiment of the invention.

DETAILED DESCRIPTION

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation).

Figure 1:
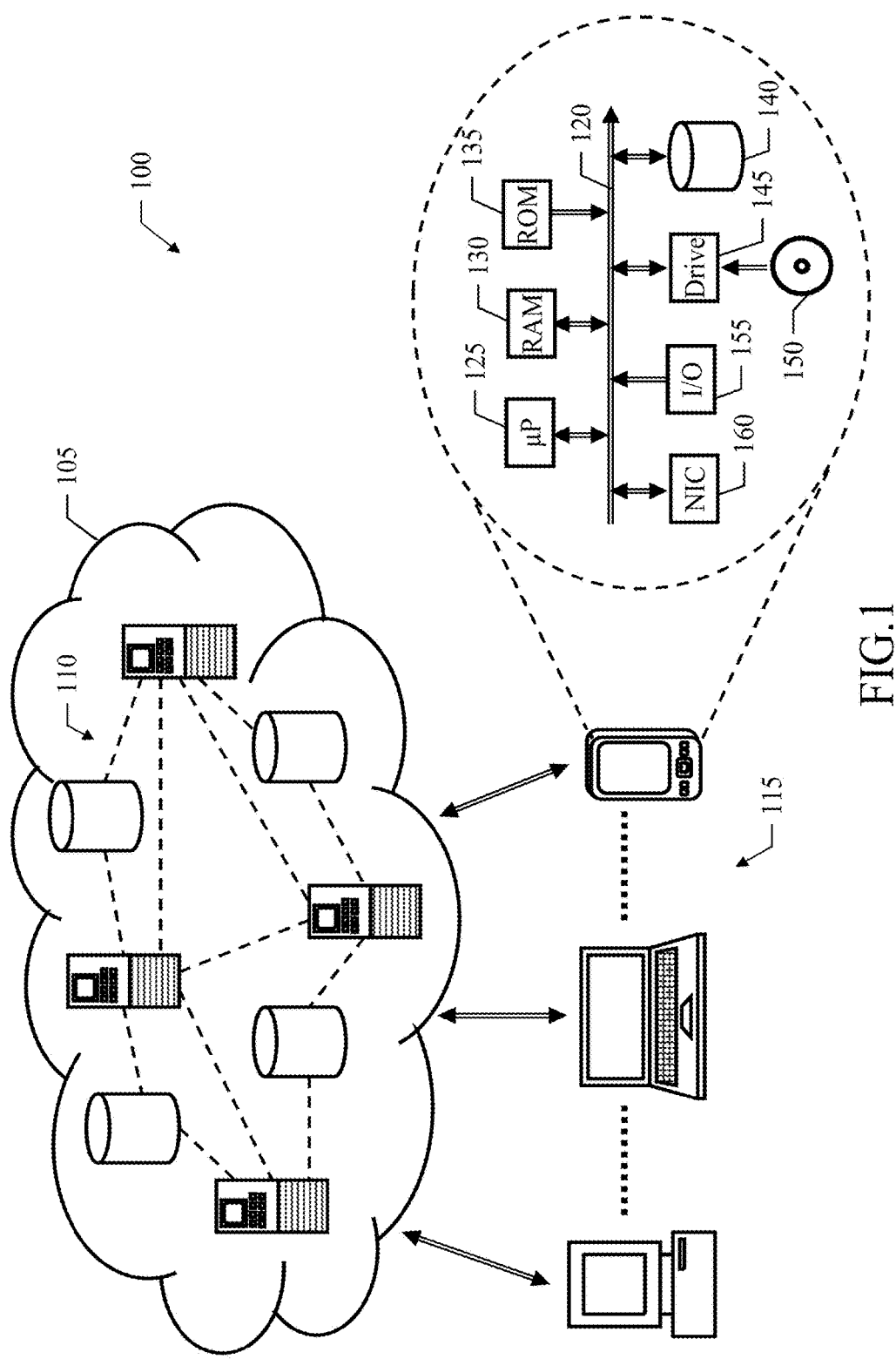
FIG. 1 shows a block-diagram of a data-processing environment wherein the solution according to an embodiment of the invention may be applied.

With reference in particular to the FIG. 1, a block-diagram is shown of a data-processing environment 100 wherein the solution according to an embodiment of the invention may be applied.

The data-processing environment 100 is based on a cloud infrastructure 105, which comprises one or more cloud nodes 110 that make available cloud resources (typically of the virtual type) on-demand as cloud services. The cloud services may be supplied according to several service models, particularly, Infrastructure as a Service, or IaaS (providing computing and storage resources with corresponding management software, such as virtual machines, virtual storage, firewalls, load balancers, and the like), Platform as a Service, or PaaS (providing software platforms, such as databases, web servers, development tools, and the like), Software As a Service, or SAS (providing software applications, such as e-mails, CRMs, office suites, and the like), and Network as a service, or NaaS (providing connectivity services, such as VPN, bandwidth on demand, and the like). The cloud services are made available by corresponding cloud providers according to different deployment models, particularly, public cloud (i.e., for the general public), private cloud (i.e., for a single organization), community cloud (i.e., for several organizations), or hybrid cloud (based on a combination of different deployment models).

Several users may access the cloud infrastructure 105 by connecting with a corresponding cloud client computing machine 115 (or simply cloud client) to the cloud nodes 110 through a communication network (not shown in the figure), such as the Internet in a public/community cloud or a LAN in a private cloud. For this purpose, each cloud node 110 exposes a front-end (which may be accessed, for example, via a web browser or a mobile app); on the contrary, a back-end of the cloud node 110 actually implementing the cloud resources is completely opaque to the users (for example, a pool of physical server computing machines, or simply servers, and storage devices being loosely coupled to each other, with a redundant architecture to ensure the required reliability level). Each user has the sole control of his/her cloud resources, which may then be used exactly as if they were dedicated physical resources; particularly, in the context of the present description the user may store information (and especially confidential information) in the cloud infrastructure 105.

Each cloud client 115 is generally of the thin type (such as a netbook, a tablet or a smartphone), since most computational and storage capabilities are supplied by the cloud infrastructure 105. More in detail, the cloud client 115 comprises several units that are connected in parallel to a bus structure 120. Particularly, one or more microprocessors (μP) 125 control operation of the cloud client 115; a RAM 130 is used as a working memory by the microprocessors 125, and a ROM 135 stores basic code for a bootstrap of the cloud client 115. Several peripheral units are further connected to the bus structure 120 (by means of respective interfaces). Particularly, a mass memory comprises internal storage devices 140 (for example, a hard-disk or a flash memory) and drives 145 for reading/writing removable storage devices 150 (for example, optical disks or memory cards). Moreover, the cloud client 115 comprises input/output units 155 (for example, a keyboard, a mouse, a monitor and/or a touch screen). A network adapter (Network Interface Card, or NIC) 160 is used to connect the cloud client 115 to the cloud infrastructure 105.

A pictorial representation of an exemplary application of the solution according to an embodiment of the invention is shown in the FIG. 2A-FIG. 2D.

Figure 2A:
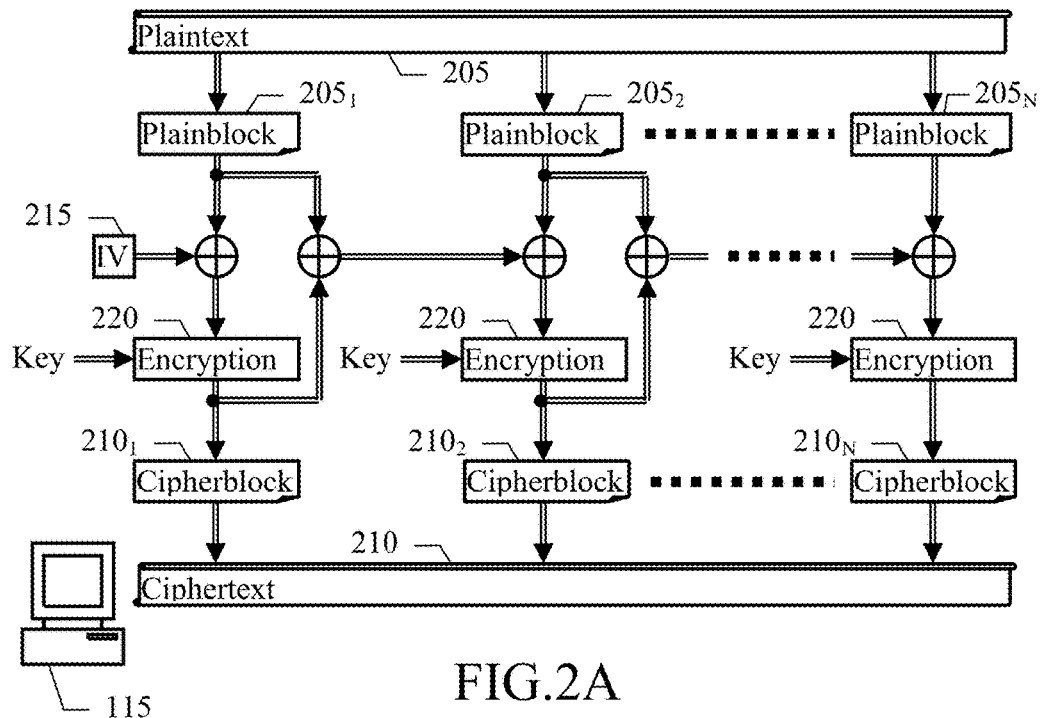
FIG. 2A-FIG. 2D show a pictorial representation of an exemplary application of the solution according to an embodiment of the invention.

Starting from the FIG. 2A, whenever the user of a generic cloud client 115 needs to store a piece of information 205 that has to be maintained confidential, the piece of information 205 is encrypted; in this way, the piece of information 205 (defining a plaintext of the encryption) is transformed into a corresponding ciphertext 210.

In the solution according to an embodiment of the invention, the ciphertext 210 is split in blocks, so that one or more blocks (or at least a part thereof) are required for decrypting the other blocks. For example, this result may be achieved by applying a Propagating Cipher-encrypted Block Chaining (PCBC) cipher.

The PCBC cipher is a specific mode of operation of a block cipher. Briefly, the block cipher is based on an encryption algorithm and a decryption algorithm that are of the deterministic type (i.e., always producing the same output for any specific input) and operate with a symmetric key (i.e., being used both for the encryption and the decryption) on groups of bits with a fixed-length, referred to as blocks and block-size, respectively (for example, of 128 bits). In order to apply the block cipher when the plaintext 205 has a variable length, the plaintext 205 is at first split into multiple blocks, referred to as plain-blocks, $205_i$ (i=1 . . . N) with the required block-size (possibly extending the last plain-block 205N with padding bits); the encryption algorithm is then applied on each plain-block $205_i$ so as to obtain a corresponding block of the chipertext, referred to as cipher-block, $210_i$ (with the union of all the cipher-blocks $210_i$ that defines the whole ciphertext 210).

The modes of operation specify how the block cipher is applied to the plain-blocks 205i using the same symmetric key. Particularly, in the PCBC the first plain-block $205_1$ is XORed with an Initialization Vector (IV) 215 (i.e., a random fixed-length value), and it is then input to an encryption primitive 220 (together with the symmetric key); this randomizes the result of the encryption, so as to hide repeated patterns in the first plain-block $205_1$. The corresponding first cipher-block $210_1$ is XORed with the first plain-block $205_1$, and the result is XORed with the second plain-block $205_2$ for input to the same encryption primitive 220 (together with the same symmetric key). These operations are reiterated up to obtain the last cipher-block $210_N$. In this way, every next cipher-block $210_{2-N}$ different from the first cipher-block $210_1$ depends on the preceding plain-blocks $205_i$ and cipher-blocks $205_i$, with any small changes in the ciphertext 210 that propagate indefinitely during the encryption.

Figure 2B:
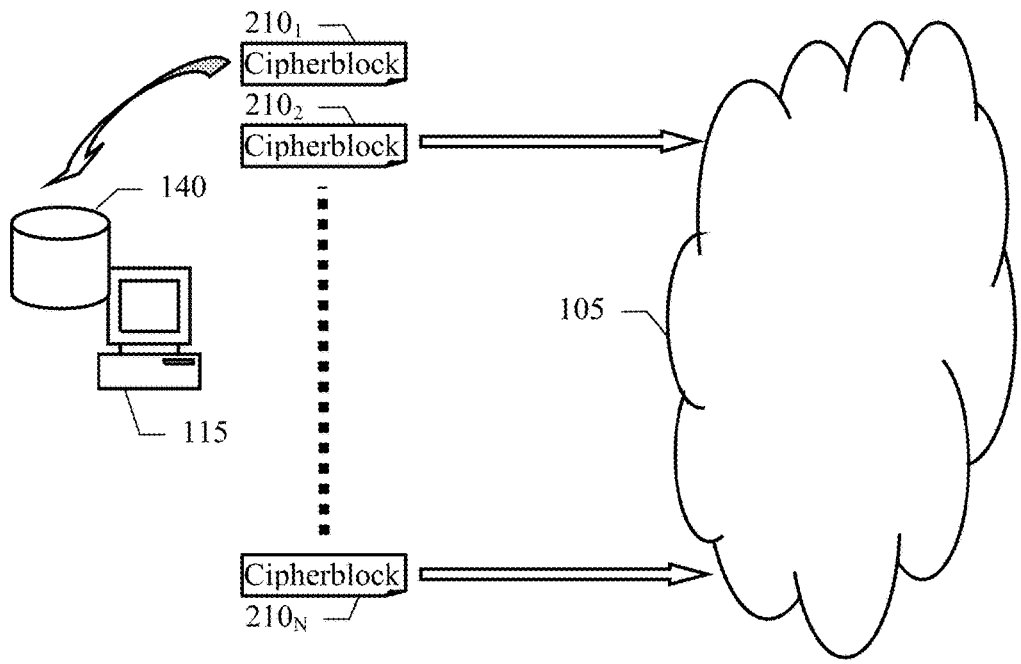

Moving to the FIG. 2B, the first cipher-block $210_1$ (or more) and the remaining next cipher-blocks $210_{2-N}$ are distributed for storing in different locations. For example, the first cipher-block $210_1$ is stored into the mass-memory 140 of the cloud client 115 (such as written into its hard-disk); on the contrary, the next cipher-blocks $210_{2-N}$ is uploaded onto the cloud infrastructure 105 (for storing into one or more cloud nodes thereof).

Figure 2C:
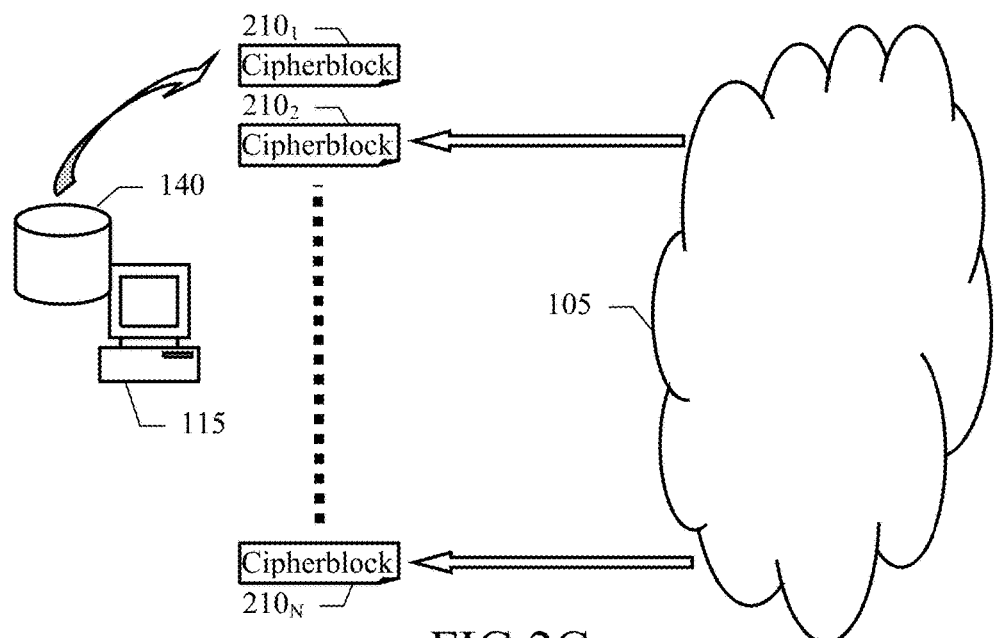
Figure 2D:
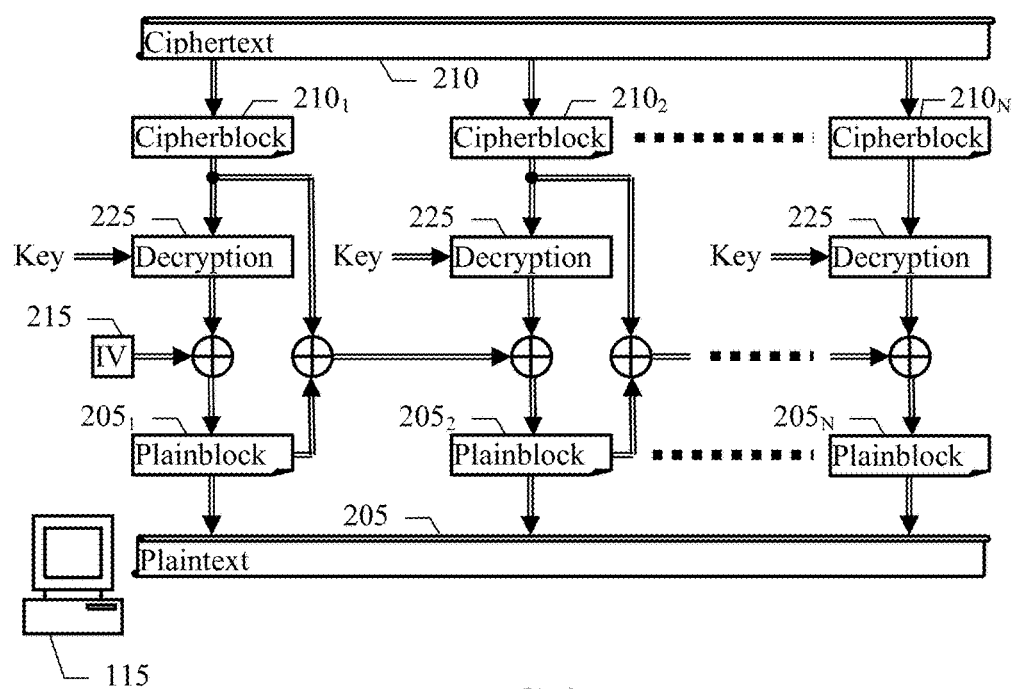

With reference now to the FIG. 2C, whenever the plaintext is required by the user of the cloud client 115, the corresponding cipher-blocks $210_i$ are retrieved; particularly, in the example at issue the first cipher-block $210_1$ is read from the mass memory 140 and the next cipher-blocks $210_{2-N}$ are downloaded from the cloud infrastructure 105. The ciphertext 210 is then reconstructed from the cipher-blocks $210_i$ (be concatenating them in the correct order).

The ciphertext 210 is decrypted as usual to restore the plaintext 205. Particularly, in the case of the PCBC as shown in the FIG. 2D, the first cipher-block $210_1$ is input to a decryption primitive 225, equal to the inverse function of the encryption primitive (together with the same symmetric key); the result of the decryption of the first cipher-block $210_1$ is then XORed with the same initialization vector 215, so as to restore the first plain-block $205_1$. The second cipher-block $210_2$ is input to the same decryption primitive 225 (together with the same symmetric key); the first cipher-block $210_1$ is XORed with the first plain-block $205_1$, and the result is XORed with the result of the decryption of the second cipher-block $210_2$, so as to restore the second plain-block $205_2$. These operations are reiterated up to obtain the last plain-block $205_N$. The plain-blocks $205_i$ are then concatenated to re-construct the plaintext 205.

The above-described solution significantly improves the security (in terms of confidentiality of the information). Indeed, in this case the next cipher-blocks cannot be decrypted without the first cipher-block (even if the symmetric key is known). Therefore, it is easier to maintain the confidentiality of the information, even when the next cipher-blocks are stored in a relatively insecure environment.

For example, the first cipher-block may be stored in a private environment (i.e., which is not accessible from outside an organization of the user), or more generally in any location having a degree of security higher than the one wherein the next cipher-blocks are stored.

This is particularly useful in a cloud infrastructure. Indeed, in this way it is possible to store most of the information in the cloud infrastructure, with only a small part thereof (i.e., the first cipher-block of each plaintext) that remains outside it. As a result, the advantages of the cloud infrastructure may be exploited as usual (for storing most of the information); however, at the same time the dissemination of the information in the cloud infrastructure does not pose additional threats to its confidentiality (since even if an attacker was able to gain access to all the next cipher-blocks and the symmetric key, the attacker would be still unable to restore any part of the corresponding plaintext).

The desired results may be achieved in a very simple way; particularly, for this purpose it is possible to use simple ciphers (such as the above-mentioned PCBC) with a beneficial effect on the performance.

A collaboration diagram representing the roles of the main software components that may be used to implement the solution according to an embodiment of the invention is shown in the FIG. 3.

The information (programs and data) is typically stored in the mass memory and loaded (at least partially) into the working memory of a generic cloud client when the programs are running, together with an operating system and other application programs (not shown in the figure). The programs are initially installed onto the mass memory, for example, from removable storage devices or from the network. In this respect, each component may represent a module, segment or portion of code, which comprises one or more executable instructions for implementing the specified logical function (or more). All the software components are denoted as a whole with the reference 300; the figure describes both the static structure of the software components 300 and their dynamic behavior (by means of a series of exchanged messages, each one representing a corresponding action, denoted with sequence numbers preceded by the symbol "A").

Particularly, an I/O module 305 of the operating system manages all the communications with the peripheral units of the cloud client; with reference in particular to its mass memory (for example, the hard-disk), for this purpose the I/O module 305 interacts with a corresponding disk driver 310 that actually controls the (physical) hard-disk. In the solution according to an embodiment of the invention, a cloud security agent 315 bridges between the I/O module 305 and the disk driver 310.

Whenever the user of the cloud client needs to store any piece of information (for example, logically defined by a file identified by its name), a store instruction for the piece of information is submitted to the I/O module 305; for example, the store command may be submitted directly by the user in a Graphical User Interface (GUI) of the operating system, or by an application program running on the cloud client (action "A1.Store"). In response thereto, the I/O module 305 submits a corresponding store command (identifying the actual piece of information by an address thereof derived from the name of the file) to the disk driver 310. The store command is intercepted by the cloud security agent 315, for example, with hooking techniques (action "A2.Intercept").

The cloud security agent 315 passes the address of the piece of information to a cipher engine 320. The chipper engine 320 retrieves the piece of information and encrypts it by applying the PCBC cipher (by generating a unique initialization vector and retrieving the symmetric key, for example, safely stored within the operating system); in this way, the piece of information (i.e., the plaintext of the PCBC cipher) is transformed into the corresponding ciphertext (action "A3.Encrypt").

The ciphertext is passed to a splitter 325; the splitter 325 also receives a security parameter (for example, ranging from 0 for minimum security to 1 for maximum security), which may be pre-defined as a configuration parameter of the cloud security agent 315 (action "A4.Configure"). The splitter 325 calculates a splitting index of the ciphertext according to the security parameter and to a total number of the cloud nodes that are available to the cloud client, for example, pre-defined as a further configuration parameter of the cloud security agent 315 as well (action "A5.Calculate"). The splitting index indicates the number of cloud nodes on which the next cipher-blocks of the ciphertext (different from the first one) will be distributed for their storing; the splitting index ranges from 1 (for the minimum security) to the total number of cloud nodes (for the maximum security). For example, the splitting index may be calculated by applying the following formula:

$$Is=Ps*(Tn-1)+1,$$

wherein Is is the splitting index, Ps is the security parameter and Tn is the total number of cloud nodes (with Is=1 for Ps=0 and Is=Tn for Ps=1). As a result, the next chiper-blocks are split into a number of groups equal to the splitting index (each one comprising a number of next chiper-blocks equal to the integer part of their total number divided by the splitting index, with the possible addition of one when this total number is not a multiple of the splitting index).

The splitter 325 now creates multiple splitting files for the first cipher-bock and for each group of next cipher-blocks; moreover, the splitter 325 saves corresponding mapping information (associating the address of the piece of information with the names of its splitting files), for example, in a dedicated look-up table (action "A6.Split"). The splitter 325 then passes the file with the first cipher-block to the disk driver 310 for its writing into the hard-disk, and it updates the mapping information accordingly (action "A7.Write"). At the same time, the splitter 325 passes the file of each group of next cipher-blocks to a network driver 330, which uploads this file onto a corresponding cloud node of the cloud infrastructure, and it updates the mapping information accordingly (action "A8.Upload").

Whenever the user of the cloud client needs to retrieve any piece of information (as above, either directly or through an application program), a retrieve instruction for the piece of information is submitted to the I/O module 305 (action "A9.Retrieve"). In response thereto, the I/O module 305 submits a corresponding retrieve command (pointing to the address of the piece of information) to the disk driver 310. As above, the retrieve command is intercepted by the cloud security agent 315 (action "A10.Intercept").

The cloud security agent 315 submits a read command to the disk driver 310 for the file of the first cipher-block of the piece of information, as identified by the corresponding mapping information, so as to cause its reading from the hard-disk (action "A11.Read"); at the same time, the cloud security agent 315 submits a download command to the network driver 320 for the file of each group of next cipher-blocks of the piece of information, as identified by the corresponding mapping information as well, so as to cause its downloading from the respective cloud node (action "A12.Download"). The (first and next) cipher-blocks so obtained are passed to an aggregator 335. The aggregator 335 aggregates the cipher-blocks by concatenating them in the correct order (as indicated in the mapping information), so as to reconstruct the whole ciphertext (action A13.Aggregate").

The aggregator 335 passes an address of the ciphertext to the cipher engine 320. The cipher engine 320 decrypts the ciphertext by applying the PCBC cipher (with the same initialization vector being used for the encryption and the same symmetric key); in this way, the corresponding plaintext (defining the required piece of information) is restored (action "A14.Decrypt). The cloud security agent 315 then returns the piece of information so obtained to the I/O module 305 (action "A15.Return").

In this way, the implementation of the above-described solution is completely opaque to the user (which is agnostic about the actual storing of the piece of information).

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), and the term a/an should be intended as one or more items (unless expressly indicated otherwise).

For example, an embodiment of the invention provides a method for storing information in a distributed data-processing environment; the method comprises the following steps. A piece of information is encrypted. The encrypted piece of information is split into at least one first encrypted block and at al least one second encrypted block; at least part of said at least one first encrypted block is required for decrypting said at least one second encrypted block. Said at least one first encrypted block is distributed for storing in at least one first location and said al least one second encrypted block is distributed for storing in at least one second location.

However, the method may be applied to any type of distributed data-processing environment (see below); moreover, it may be applied to information of any type (for example, databases, tables, e-mails, programs) and with any content (for example, text, graphics, voice, video, code). The piece of information may be encrypted in other ways (see below), and it may be split into first and second blocks of any type, size and number. The (first and second) blocks may be distributed in any way for their storing in any type and number of locations (see below).

In an embodiment of the invention, the step of encrypting a piece of information comprises applying a block cipher to the piece of information. For this purpose, the piece of information is split into a sequence of a plurality of fixed-length further blocks. Each further block is encrypted with a common encryption key; for this purpose, the encryption is applied to a first one of the further blocks in the sequence being updated according to an initialization vector and to each next one of the further blocks in the sequence (different from the first further block) being updated according to a previous one of the further blocks in the sequence.

However, other encryption techniques may be used (for example, working on blocks with variable length or using different keys); more generally, the desired result may also be achieved with any other suitable encryption technique (even not based on the block cipher).

In an embodiment of the invention, the step of encrypting a piece of information comprises applying a PCBC cipher to the piece of information.

However, other modes of operation of the block cipher may be applied, for example, the Cipher FeedBack (CFB) or the Output FeedBack (OFB).

In an embodiment of the invention, said at least one first encrypted block is the encrypted first further block.

However, nothing prevents using two or more of the encrypted further blocks; in any case, the splitting of the encrypted piece of information for its distribution (into the first and second encrypted blocks) may also be completely independent of the splitting of the piece of information for its encryption (into the further blocks).

In an embodiment of the invention, the step of distributing comprises distributing said at least one first encrypted block for storing locally in a private environment and distributing said at least one second encrypted block for storing remotely by at least one service provider.

However, each first encrypted block may be stored locally in other ways (see below); moreover, it may be stored in any type of private environment (for example, in a secure internal server). Likewise, each second encrypted block may be stored remotely in other ways (see below); moreover, it may be stored by any type and number of service providers (for example, a storage web site).

In an embodiment of the invention, the step of distributing comprises uploading said at al least one second encrypted block onto a cloud infrastructure.

However, the cloud infrastructure may be of any type (with any type and number of nodes or service providers); in any case, the application of the same technique to other distributed data-processing environments (for example, a client-server system) is not excluded.

In an embodiment of the invention, the steps of encrypting and splitting are executed on a computing machine of a user; the step of storing comprises writing said at least one first encrypted block into a mass-memory of the computing machine.

However, the encryption and/or the splitting may be performed on other computing machines (for example, secure internal servers); moreover, the first encrypted block(s) may be written in any other type of mass-memory (for example, a removable storage device). In any case, nothing prevents storing the first encrypted block(s) elsewhere (for example, in another location of the same organization connected via a VPN).

In an embodiment of the invention, the method further comprises intercepting a store command for storing the piece of information; the steps of encrypting, splitting and distributing are performed in response to the interception of the store command.

However, the store command may be submitted in other ways (for example, to a cloud module) and it may be intercepted in other ways (for example, with wrapping techniques); in any case, a dedicated command may be provided for invoking the above-mentioned functions.

In an embodiment of the invention, said at least one second encrypted block is a plurality of second encrypted blocks; the step of distributing comprises distributing the second encrypted blocks to a plurality of second locations.

However, the second locations may be of any type (for example, sub-nets, servers, storage devices) and in any number (down to a single one); moreover, the encrypted piece of information may be split in any other way (for example, simply in even parts according to the number of second locations).

In an embodiment of the invention, the method further comprises receiving a security parameter, and determining a number of the second locations (ranging from 1 to a total number of the second locations being available) according to the security parameter.

However, the security parameter may be of any other type (for example, a simple dichotomy parameter that may only take two values, low or high) and it may be provided in any other way (for example, entered by the user at run-time or associated with the piece of information); moreover, the security parameter may be used in any other way to determine the number of the second locations (for example, simply one or all when the security index is low or high, respectively). In any case, nothing prevents always using the same number of second locations.

In an embodiment of the invention, the method further comprises the following steps. Said at least one first encrypted block and said al least one second encrypted block are retrieved from said at least one first location and from said at least one second location, respectively. The encrypted piece of information is reconstructed from said at least one first encrypted block and said at al least one second encrypted block. The encrypted piece of information is then decrypted to restore the piece of information.

However, the above-mentioned operations may also be performed by another entity (for example, when the piece of information is to be transmitted thereto).

In an embodiment of the invention, the method further comprises intercepting a retrieve command for retrieving the piece of information; the steps of retrieving, reconstructing and decrypting are performed in response to the interception of the retrieve command.

As presented herein in one embodiment, a solution for storing information in a distributed data-processing environment is presented. A corresponding method (A1-A15 in FIG. 3) comprises encrypting (A3) a piece of information, splitting (A4-A6) the encrypted piece of information into at least one first encrypted block and at al least one second encrypted block, at least part of said at least one first encrypted block being required for decrypting said at least one second encrypted block, and distributing (A7-A8) said at least one first encrypted block for storing in at least one first location and distributing said at least one second encrypted block for storing in at least one second location.

However, as above the retrieve command may be submitted or intercepted in other ways, or a dedicated command may be provided for invoking the above-mentioned functions.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment of the invention provides a computer program for causing a computing machine to perform the steps of the above-described method when the computer program is executed on the computing machine.

A further embodiment of the invention provides a computer program product comprising a non-transitory computer readable medium embodying a computer program, the computer program comprising code directly loadable into a working memory of a computing machine thereby configuring the computing machine to perform the same method.

However, the above-described solution may be implemented as a stand-alone module, as a plug-in for the operating system, or even directly in the operating system. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." A further embodiment of the invention provides a system comprising means for performing the steps of the above-described method.

Note further that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Note further that one or more methods described herein may also be carried out on a system based on a different architecture (for example, a local, wide area, global, cellular or satellite network), and exploiting any type of (wired and/or wireless) connections.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Thus, as presented herein, the solution according to one or more embodiments of the present invention is based on the idea of distributing the information required for the decryption.

Particularly, one or more aspects of the solution according to specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect of the solution according to an embodiment of the invention provides a method for storing information in a distributed data-processing environment, wherein an encrypted piece of information is split into a first encrypted block (or more) and one or more second encrypted blocks (with at least part of the first encrypted block that is required for decrypting the second encrypted blocks), which first encrypted block and second encrypted blocks are distributed for storing in different locations.

A further aspect of the solution according to an embodiment of the invention provides a corresponding computer program (and a corresponding computer program product).

A further aspect of the solution according to an embodiment of the invention provides a corresponding system.

What is claimed is:

1. A method for storing information in a distributed data-processing environment, the method comprising:
    encrypting, by one or more processors, a piece of information;
    splitting, by one or more processors, the encrypted piece of information into at least one first encrypted block and at least one second encrypted block, at least part of said at least one first encrypted block being required for decrypting said at least one second encrypted block;
    distributing, by one or more processors, said at least one first encrypted block for storing in at least one first location;
    distributing, by one or more processors, said at least one second encrypted block for storing in at least one second location;
    retrieving, by one or more processors, said at least one first encrypted block and said least one second encrypted block from said at least one first location and from said at least one second location, respectively;
    reconstructing, by one or more processors, the encrypted piece of information from said at least one first encrypted block and said at least one second encrypted block;
    decrypting, by one or more processors, the encrypted piece of information to restore the piece of information; and
    intercepting, by one or more processors, a retrieve command for retrieving the piece of information, wherein said retrieving, reconstructing and decrypting are performed in response to the interception of the retrieve command.

2. The method according to claim 1, wherein said encrypting a piece of information comprises:
    applying, by one or more processors, a block cipher to the piece of information by:
    splitting the piece of information into a sequence of a plurality of fixed-length further blocks, and
    encrypting each further block with a common encryption key by applying an encryption to a first one of the further blocks in the sequence being updated according to an initialization vector and to each next one of the further blocks in the sequence, different from the first further block, being updated according to a previous one of the further blocks in the sequence.

3. The method according to claim 2, wherein said encrypting a piece of information comprises:
    applying, by one or more processors, a Propagating Cipher-encrypted Block Chaining (PCBC) cipher to the piece of information.

4. The method according to claim 2, wherein said at least one first encrypted block is an encrypted version of said first further block.

5. The method according to claim 1, wherein said distributing said at least one first encrypted block and said distributing said at least one second encrypted block comprises:
    distributing, by one or more processors, said at least one first encrypted block for storing locally in a private environment; and
    distributing, by one or more processors, said at least one second encrypted block for storing remotely by at least one service provider.

6. The method according to claim 5, wherein said distributing said at least one second encrypted block comprises:
    uploading, by one or more processors, said at least one second encrypted block onto a cloud infrastructure.

7. The method according to claim 1, wherein said encrypting and splitting are executed on a computing machine of a user, and wherein said storing said at least one first encrypted block in at least one first location comprises:
    writing, by one or more processors, said at least one first encrypted block into a mass-memory of the computing machine.

8. The method according to claim 1, further comprising:
    intercepting, by one or more processors, a store command for storing the piece of information, wherein said encrypting, splitting, distributing said at least one first encrypted block, and distributing said at least one second encrypted block are performed in response to the interception of the store command.

9. The method according to claim 1, wherein said at least one second encrypted block is a plurality of encrypted blocks, where said distributing said at least one second encrypted block comprises:
    distributing, by one or more processors, the encrypted blocks from the second encrypted block to a plurality of locations.

10. The method according to claim 9, further comprising:
    receiving, by one or more processors, a security parameter; and
    determining, by one or more processors, a number of the second locations, ranging from 1 to a total number of the second locations being available, according to the security parameter.

11. The method of claim 1, wherein the at least on one first encrypted block is a first cipher block of a sequence of cipher blocks.

12. The method of claim 1, wherein the at least on one first encrypted block is a first cipher block of a sequence of cipher blocks, and wherein the method includes storing by the one or more processors, the at least one first encrypted block in a location having a higher level of security than a location for storing the at least one second encrypted block.

13. A computer program product for storing information in a distributed data-processing environment, the computer program product comprising a computer readable storage device having program code embodied therewith, the program code readable and executable by a processor to perform a method comprising:
    encrypting a piece of information;
    splitting the encrypted piece of information into at least one first encrypted block and at least one second encrypted block, at least part of said at least one first encrypted block being required for decrypting said at least one second encrypted block;

distributing said at least one first encrypted block for storing in at least one first location; and distributing said at least one second encrypted block for storing in at least one second location;

retrieving said at least one first encrypted block and said least one second encrypted block from said at least one first location and from said at least one second location, respectively;

reconstructing the encrypted piece of information from said at least one first encrypted block and said at least one second encrypted block;

decrypting the encrypted piece of information to restore the piece of information; and intercepting a retrieve command for retrieving the piece of information, wherein said retrieving, reconstructing and decrypting are performed in response to the interception of the retrieve command.

14. The computer program product according to claim 13, wherein said encrypting a piece of information comprises:

applying a block cipher to the piece of information by:

splitting the piece of information into a sequence of a plurality of fixed-length further blocks, and encrypting each further block with a common encryption key by applying an encryption to a first one of the further blocks in the sequence being updated according to an initialization vector and to each next one of the further blocks in the sequence, different from the first further block, being updated according to a previous one of the further blocks in the sequence.

15. The computer program product according to claim 14, wherein said encrypting a piece of information comprises:

applying a Propagating Cipher-encrypted Block Chaining (PCBC) cipher to the piece of information.

16. The computer program product according to claim 14, wherein said at least one first encrypted block is an encrypted version of said first further block.

17. A computer system comprising:

a processor, a computer readable memory, and a computer readable storage medium;

first program instructions to encrypt a piece of information;

second program instructions to split the encrypted piece of information into at least one first encrypted block and at least one second encrypted block, at least part of said at least one first encrypted block being required for decrypting said at least one second encrypted block;

third program instructions to distribute said at least one first encrypted block for storing in at least one first location; and fourth program instructions to distribute said at least one second encrypted block for storing in at least one second location;

fifth program instructions to retrieve said at least one first encrypted block and said least one second encrypted block from said at least one first location and from said at least one second location, respectively;

sixth program instructions to reconstruct the encrypted piece of information from said at least one first encrypted block and said at least one second encrypted block;

seventh program instructions to decrypt the encrypted piece of information to restore the piece of information; and eighth program instructions to intercept a retrieve command for retrieving the piece of information, wherein said retrieving, reconstructing and decrypting are performed in response to the interception of the retrieve command; and wherein the first, second, third, fourth, fifth, sixth, seventh and eighth program instructions are stored on the computer readable storage medium and executed by the processor via the computer readable memory.

18. The computer system according to claim 17, further comprising:

ninth program instructions to apply a block cipher to the piece of information by:

splitting the piece of information into a sequence of a plurality of fixed-length further blocks, and encrypting each further block with a common encryption key by applying an encryption to a first one of the further blocks in the sequence being updated according to an initialization vector and to each next one of the further blocks in the sequence, different from the first further block, being updated according to a previous one of the further blocks in the sequence; and wherein the ninth program instructions are stored on the computer readable storage medium and executed by the processor via the computer readable memory.

* * * * *